UNITED STATES PATENT OFFICE.

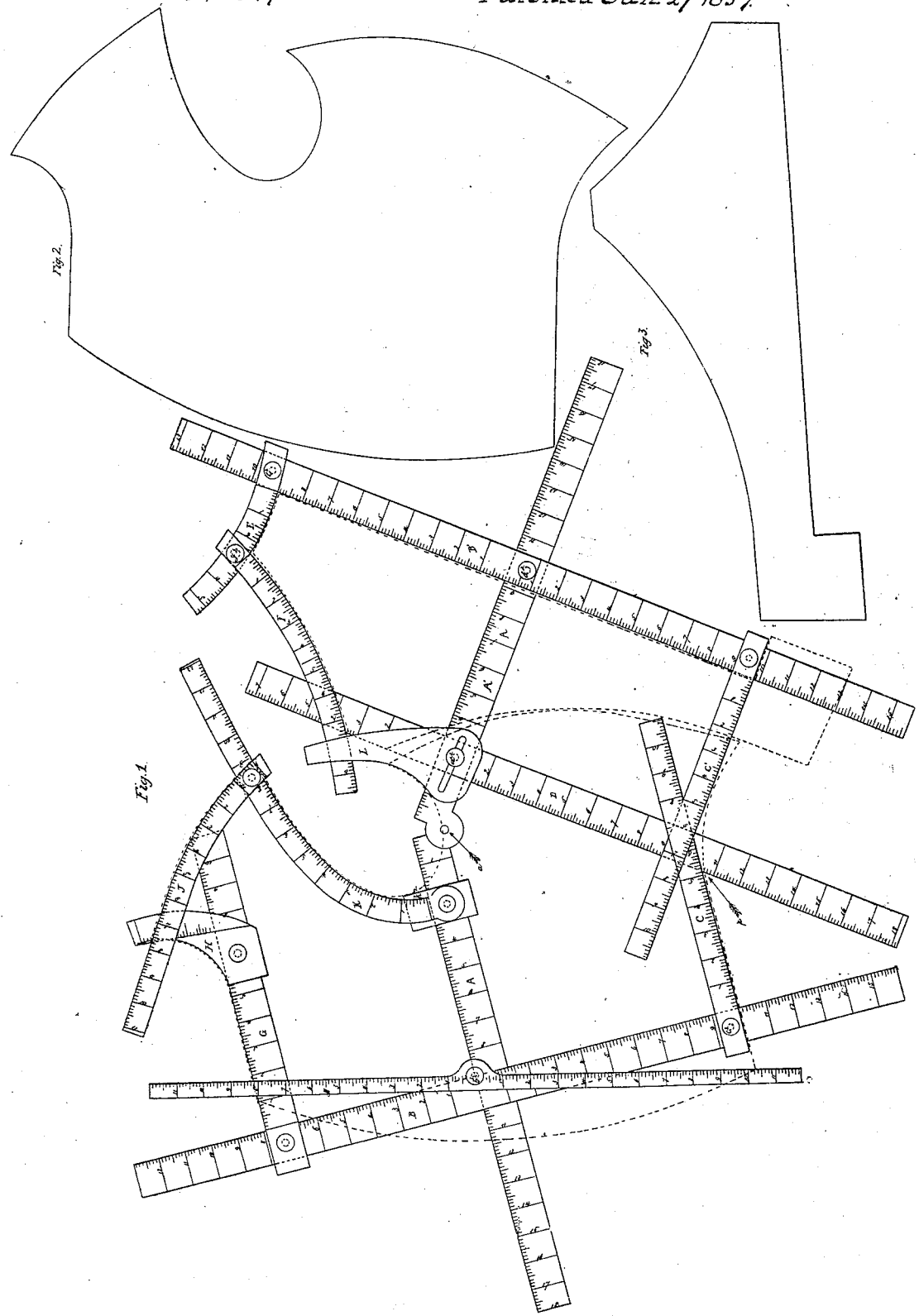
L. Derby.
Tailors' Measure
No. 16472
Patented Jan. 27 1857

LYMAN DERBY, OF NEW YORK, N. Y.

TAILOR'S MEASURE.

Specification of Letters Patent No. 16,472, dated January 27, 1857.

*To all whom it may concern:*

Be it known that I, LYMAN DERBY, of the city, county, and State of New York, have invented a certain new and useful machine or instrument for delineating by rule tailors' measurements for cutting and fitting coats, and other garments, which I have designated "Derby's Diagraphic Coat-Delineator"; and I do hereby declare the following to be a full description of the same, reference being had to the accompanying drawings, forming a part of this specification, the same letters of reference wherever they occur referring to like parts.

Figure 1, is a plan view of the instrument showing by the red outlined diagram the half of a coat. Figs. 2 and 3 represent the diagrams of the breast and back of the coat.

My improvement consists in the arrangement of the combined graduated rules for delineating the back and front of a coat upon a jointed rule which passes laterally through them, the joint serving to suspend them at any desired angle respecting each other, and thus enabling the draftsman to transfer the entire measurement of both the back and front of the garment at one operation and this without removing any part of the delineator or instrument while making the transfer.

Letters A, A', represent a jointed rule having any required number of inches, (say 18 on each half) marked off upon it. This rule may be said to be a base upon which the entire structure of the instrument is predicated, and is used for measuring the half circumference of the bust, put under the arms, by means of the rules B' and B, secured upon its outer ends by slides and set screws $b^2$, $b^3$. These rules work at right angles to the rule A, A', and have inches marked upon them commencing at their intersection with the upper edge of the rule A, A', and counting toward their ends.

B', is a rule used for measuring the length of waist down the middle of the back. Upon its lower end, and at right angles to it is a sliding rule C', having a scale of inches upon it and used for the purpose of measuring the waist point of the back; and upon its upper end a sliding rule E, having a slight curve, so as to fit the round of the neck, and having a scale of inches marked upon it, commencing from the inner line of the rule B', and held by a screw $c^2$, for the purpose of measuring the top of the back of the coat. Letter F, is a shoulder seam rule, secured on the end of E, by a screw $f^2$, and having its face divided into inches commencing from the inner edge of E. The slide of this rule is made quite open; the object of which is to allow of adjustment at pleasure to make a broad or narrow shoulder seam.

Letter D, is a shoulder and hip point sliding rule, having a scale of inches marked upon its face commencing from the upper edge of the rule A', and counting toward the ends, and adjusted by a set screw $d^2$, upon the rule A'. The object of this rule is to obtain the measure of the width of back and locate the position of the arm hole; also for balancing the coat by marking the hip point ($p$) and as the two rules B' and D, are parallel to each other, and at right angles to the rule, C' and A', it will readily be perceived in connection with the operations of the breastrule B, that the waist, breast, and collar lines or points are curved lines of measurement, which when fitting upon the rounded bust of the human subject take the shape of the body with a graceful and easy fit, and balances the front and back without bagging or drawing the seams. Upon the rule D, at its intersection with the rule A', is secured a curved arm or shoulder rule L, having an adjustable slot in it, so as to be adjustable to the round of the arm and forming a part of a circle of the arm hole, when the line is carried through the joint or center point $a^2$, of the rule A.

Letter B, is a breast rule, having a graduated scale of inches marked upon it, commencing from the upper line or edge of the front end of the rule A, and counting toward the end. This rule is secured by a set screw $b^3$, upon the rule A, and its object is to take the measure of the bust. Upon its lower end is secured by a slide and set screw $c^3$, the front half of the waist rule C, having a scale of inches marked upon it, commencing from the inner line or edge of the rule B, and counting toward its ends. This rule works at right angles to the rule B, and its object is to ascertain the location of the hip point ($p$) upon the diagram and measure the complement of the back half of the waist measurement. Upon the upper end of the rule B, is a slide rule G, arranged so as to work at right angles to it, and parallel with the rule A', and having a scale of inches marked upon it commencing from the inner edge of the breast rule and counting toward the outer end. The object of this rule is to obtain the line for the collar and also for measuring the length of the coat from the neck to the hip point ($p$) or waist, by means of the curved neck sliding rule H, adjusted by a set screw upon or near the end of the rule G, and having a scale of inches marked upon it, commencing from the upper edge of the rule G, and counting upward.

Letter M, is a straight edge rule, secured by a center screw, so as to have a center of motion always at the angle formed by the intersection of the rules A and B. The object of this rule is to measure, or take the navel point, and point for length of collar, from which points the operator allows such swell for lap of breast as fancy dictates.

Letter K, is an adjustable sliding rule upon the rule A, near its center point ($a^2$). This rule forms the front half of the arm hole rule, having a scale of inches marked upon it, commencing at the upper edge of the rule A, and counting outward. This curve of the rule is made so as to take the form of the arm holes by a curved line being drawn by the pencil of the dividers through the center of the joint ($a^2$). Upon the upper end of this arm hole rule is secured by a loose slide and set arm a curved seam rule J, having a scale of inches marked on it, commencing at the lower or graduated edge of the rule K, and counting outward. This rule has a shape similar to that of the back shoulder seam rule F, and works on a loose center in a like manner as F, does, the object of which is, that as the back and front of the coat is put together these two seams, that is (F and J,) must match; consequently this shape and mode of adjustment must be like each other, otherwise the coat will not go together.

The application and use of my invention will be better understood by the following tape measurements and application of the same. As a prerequisite however to the use of my rule, it is necessary that the operator should always mark his hip point ($p$) from the center seam of the back, at the same distance as the width of the back to the front of shoulder, that is if the back measures $7\frac{1}{4}$ inches, the hip point must be marked also $7\frac{1}{4}$ inches, and whatever difference between this and the measurement of the waist must be added to the front of the coat. With this explanation of the rule for taking measurements the following measurements have been made, towit: 19 inches length of waist; $7\frac{1}{4}$ inches width of back; $7\frac{1}{4}$ inches width of waist; 10 inches distance from arm pit to hip point; 23 inches length of body from center of back of neck over the front of the shoulder to the hip point; $25\frac{1}{2}$ inches length of body from center of back of neck over the breast to naval point; $16\frac{1}{4}$ inches circumference of the shoulder for arm hole; 18 inches half circumference of breast under the arms; 15 inches half circumference of the waist at naval point.

To apply these measurements the operator lays the delineator upon the table and sets the rules B' and B, upon the rule A, back 9 inches each way from the center point ($a^2$) making 18 inches the half circumferance of the waist. Having done this the rule D, is set forward, on A', so that the distance of its graduated edge from the graduated edge of the rule B', measures $7\frac{1}{4}$ inches the width of the back—$c'$ and $c$, upon the lower ends of the rules B' and B, and parallel with the rule A, are then set down from the graduated edge of the rule A', A, 10 inches for the measurement of the length of waist from the arm pit to the hip point ($p$); and the rule E, upon the upper end of the rule B', is set up 9 inches from the upper edge of the rule A', making, (inclusive of the 10 inches from A', down to C',) 19 inches for the length of waist. The lower ends of the rules B' and B, are then drawn toward each other, so that the rules C' and C, measure the half circumference of the waist, that is, the rule C', will indicate by its intersection with the rule D, $7\frac{1}{4}$ inches; the width of the waist from middle seam of back to the hip point ($p$). While the rule B, with the rule C, on it will be set so as to measure $7\frac{1}{4}$ inches, the complement of the sum of 15 inches the waist measurement; and as the rules C' and C, are parallel with the rule A', A, and at right angles to the rule B' and B, they cross the rule D, and locate the hip point ($p$) for the purpose of getting the measurement of the length of the body from the back of neck to the hip point. To get this measurement the operator sets the neck slide H, on the upper end of the rule G, forward till its graduated edge is about on a line with the inner straight edge of the slide $k^2$, of the rule K, and then sliding up the rule G, on the upper end of B, till the measurement of 23 inches, (inclusive of the measurement of E, between F and B', forming the top of the back of the coat,) is obtained. The rule K, is then set forward toward the center point $a^2$, so that a division having a span of the third part of $16\frac{1}{4}$ inches, and touching the center ($a^2$) and the front edge of the curved shoulder rule L, will also touch the graduated edge of the rule K, and thereby indicate the circumference of the arm hole $16\frac{1}{4}$ inches. The rule J, is then depressed upon the end of the neck rule H, till its graduated edge touches a point or line upon it, that would measure in a straight line to the hip point ($p$) $20\frac{1}{2}$ inches, to which measurement being added the $2\frac{1}{2}$ inches of the rule E, between the rule B' and F, gives a total of 23 inches, for the measure of the length of coat. The operator next adjusts the straight edge breast rule M, so that the lower end of it, when extended outward will indicate the navel point 25½ inches, inclusive of the 2½ inches of E, between B' and F, while the upper end of it will mark the length of collar, though this is not material as the fashions regulating the length of it will always be a discretionary matter with the tailor.

It will be obvious to the tailor, that the allowance for overlap of the breast to button, being outside of all measurements, it is left discretionary for the tailor to make what allowance he desires: also for the side seams of the back, because when having established the arm hole points and width of back, the fancy of the operator in cutting broad back, or long or short shoulder seams will be his guide, as in no case, if the rules of measurement are followed will these differences make any material change in the cut or fit of the coat.

Having now described my invention and its application and use what I claim and desire to secure by Letters Patent is—

The arrangement of the graduated rules for giving the outlines of the back and front of a coat when said back and front rules are suspended upon the jointed rule A, A', substantially in the manner and for the purpose specified.

LYMAN DERBY.

Witnesses:
SAML. ROWLEY,
CHARLY S. BARRITT.